United States Patent [19]

Mori

[11] Patent Number: 4,741,649
[45] Date of Patent: May 3, 1988

[54] THROWAWAY TIP

[75] Inventor: Yoshikatsu Mori, Itami, Japan

[73] Assignee: Sumitomo Electric Industries, Ltd., Osaka, Japan

[21] Appl. No.: 926,979

[22] Filed: Nov. 4, 1986

[30] Foreign Application Priority Data

Nov. 14, 1985 [JP] Japan .................... 60-174190[U]

[51] Int. Cl.⁴ .............................................. B23B 27/22
[52] U.S. Cl. .................................... 407/114; 407/116
[58] Field of Search .............. 407/113, 114, 115, 116

[56] References Cited

U.S. PATENT DOCUMENTS

| | | | |
|---|---|---|---|
| 3,399,442 | 9/1968 | Jones et al. | 407/114 |
| 3,733,664 | 5/1973 | McKelvey | 407/114 |
| 3,792,514 | 2/1974 | Ushijima | 407/116 |
| 3,815,192 | 6/1974 | Ohtsu et al. | 407/114 |
| 4,214,845 | 7/1980 | Mori | 407/114 |
| 4,318,645 | 3/1982 | McCreery | 407/114 |
| 4,487,534 | 12/1984 | Reiter | 407/114 |
| 4,507,024 | 3/1985 | Stashko | 407/114 |
| 4,597,696 | 7/1986 | Maeda et al. | 407/114 |
| 4,626,141 | 12/1986 | Malaker et al. | 407/114 |

Primary Examiner—Frederick R. Schmidt
Assistant Examiner—Blynn Shideler
Attorney, Agent, or Firm—W. G. Fasse; D. H. Kane, Jr.

[57] ABSTRACT

A throwaway cutting tip (31) has two substantially polygonal main surfaces (32, 33) and cutting edges (42, 43, 44, 45, 49, 50) in the form of a curved line projecting inwardly in the direction of the thickness of the tip. The cutting edges extend between nose portions (38, 39, 40, 41) positioned at apexes of the polygon. The main surface has a flat central portion (47) in the middle. A rake surface having two portions extends between the flat central portion and the cutting edge. The rake surface (51) has a flat portion (56) and a curved, concave portion (53). The curved concave surface portion (53) connecting the lowermost edge (52) of the flat rake surface portion to the flat central portion functions as a chip breaking surface. The chip breaking is enhanced by a plurality of projections (55) arranged along the curved concave surface portion. Each nose portion has a nose protecting surface (38a, 39a, 40a, 41a) extending parallel to the flat central portion inwardly from an end edge defined between lateral surfaces (34, 35, 36, 37) and the main surface.

6 Claims, 5 Drawing Sheets

| | CUTTING RESISTANCE |
| --- | --- |
| | 5   10   15  KW |
| EMBODIMENT | ▭ |
| PRIOR ART | ▭ |
| PRIOR ART | ▭ |

| | TIME REQUIRED FOR TIP BREAKING(MIN) |
| --- | --- |
| | 10   20   30 |
| EMBODIMENT | ▭ |
| PRIOR ART | ▭ |
| PRIOR ART | ▭ |

═ : EMBODIMENT
── : PRIOR ART
--- : PRIOR ART

THROWAWAY TIP

BACKGROUND OF THE INVENTION

1. Field of the Invention

This invention relates to improvements in a disposable throwaway cutting tip used for machining metal work.

2. Description of the Prior Art

As is known in the art, in machine tools such as lathes, throwaway cutting tips, triangular or quadrangular in plan view, made from hard alloys such as cemented carbide, are used for an improved operation or for reducing cost. FIGS. 15 to 17 are views showing an example of this type of throwaway cutting tip. In this throwaway cutting tip 1, straight cutting edges 2 are formed between nose portions 3. Each cutting edge 2 has an inwardly formed land portion 4 extending parallel to the cutting edge 2. The land portion has an inwardly formed rake surface 5. Further, inwardly of the rake surface 5 there is an attaching surface 6 provided with a central hole 7 for attaching the throwaway tip to a machine tool.

Generally, a throwaway tip having a construction most suitable for the material to be cut, must be selected and used. However, the throwaway tip 1 has straight cutting edges 2, and negative tips in general have negative rake angles. Thus, as is known in the art, the cutting resistance of throwaway tips is high, posing a problem that chips tend to thermally stick to the cutting edge 2. For example, in the case of cutting a difficultly machinable material, such as stainless steel or Inconel (R.T.M.), the material hardly softens and is tenacious, so that chips thermally stick to the tip to a greater degree and hence the cutting resistance is particularly high. Furthermore, since the work hardening is very high, the cutting resistance further increases, leading to such undesirable phenomena as chipping.

U.S. Pat. No. 3,399,442 (Jones et al) discloses a throwaway tip which has solved the aforesaid problems encountered when a difficultly machinable material such as stainless steel or Inconel (R.T.M.) is cut. Jones et al, as shown in present FIGS. 18 and 19, disclose a throwaway tip 10 which does not have any land. Further, as shown in FIG. 18, the cutting edges 12 are straight as seen in the plan view but in a side view, as shown in FIG. 19, the cutting edges 12 are concave with respect to the attaching surface 16. Thus, the cutting resistance is reduced and thermal sticking of the chips is prevented. Therefore, the tip of Jones et al is widely used for cutting the aforesaid difficultly machinable materials.

However, since the known throwaway tip 10 has concave cutting edges 12, as seen in the side view, the cutting force tends to be concentrated locally. Further, the nose portions 3 which are inherently low in strength, are formed such that the rake surfaces 15 have a predetermined angle. Therefore, the strength of the nose portions 3 is low and hence the cutting areas have an acute angle, posing a problem that they tend to chip. Each concave rake surface 15 has a first surface portion 15a and a second surface portion 15b which functions as a chip breaker, said first surface 15a being gently curved as a whole. Therefore, as shown in FIGS. 20 and 21, a chip 19 produced during the cutting of a work piece 18 comes in contact over a certain width with the wall of the chip breaker surface 15b. Thus, the resistance of contact of the chip 19 on the chip breaker surface 15b is high, resulting in a problem that pressure sticking of the chip 19 occurs or the throwaway tip 10 tends to break.

SUMMARY OF THE INVENTION

Accordingly, it is an object of the invention to provide a throwaway cutting tip, which eliminates said problems, wherein such undesirable phenomena as chipping in the nose portions hardly take place and the cutting resistance is reduced to a substantial degree, so that the tip is capable of smoothly cutting such difficultly machinable materials as stainless steels and Inconel (R.T.M.).

According to the invention, there is provided a throwaway cutting tip wherein a contour is defined between opposed substantially polygonal main surfaces and lateral surfaces interconnecting the main surfaces, and wherein cutting edges are formed between nose portions positioned at the apexes of the substantially polygonal shape along end edges defined between at least one of the main surfaces and lateral surfaces. The cutting edges are provided along the edges of the main surface. The following are characteristic features of the present cutting tips. The main surface having the cutting edge formed on the end edge thereof, comprises a flat portion formed in the central region, a rake surface formed between the flat portion and each cutting edge and shaped concave as seen in a sectional view taken in a direction at right angles to the cutting edge, and a plurality of projections formed along the direction in which said cutting edge extends on a surface having a chip breaking function. The projections connect the lowermost end of the rake surface to the flat portion. Further, each nose portion has a nose protecting surface connected to the end edge defined between the lateral surface and main surface and extending parallel to the flat portion.

In this invention, the rake surface, as seen in sectional view taken in a direction at right angles to the cutting edge is concave, and the chip breaking surface connects the lowermost end of the rake surface to the flat portion in the middle of the main surface. The plurality of projections on the chip breaking surface extend along the direction in which the cutting edge extends. Since the area of contact of chips with the chip breaking surface is reduced, the contact resistance of the chips with the chip breaking surface is also reduced. As a result it is now possible to reduce the cutting resistance to a great degree.

Further, since the nose portion is formed, immediately inside the end edge defined between the lateral surface and the main surface, with the nose protecting surface extending parallel to the flat portion, the thickness in the vicinity of the nose portion is not reduced from the end edge to the inside, so that the strength of the nose portion is actually increased. Therefore, it is possible to obtain a throwaway tip having a long life, in which such undesirable phenomena as chipping hardly occur.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a plan view, FIG. 16 is a side view and FIG. 17 is a sectional view taken along the line XVII—XVII in FIG. 15;

DESCRIPTION OF THE PREFERRED EMBODIMENTS

FIGS. 1 to 6 are views for explaining a throwaway cutting tip according to an embodiment of the invention.

Figure 1:
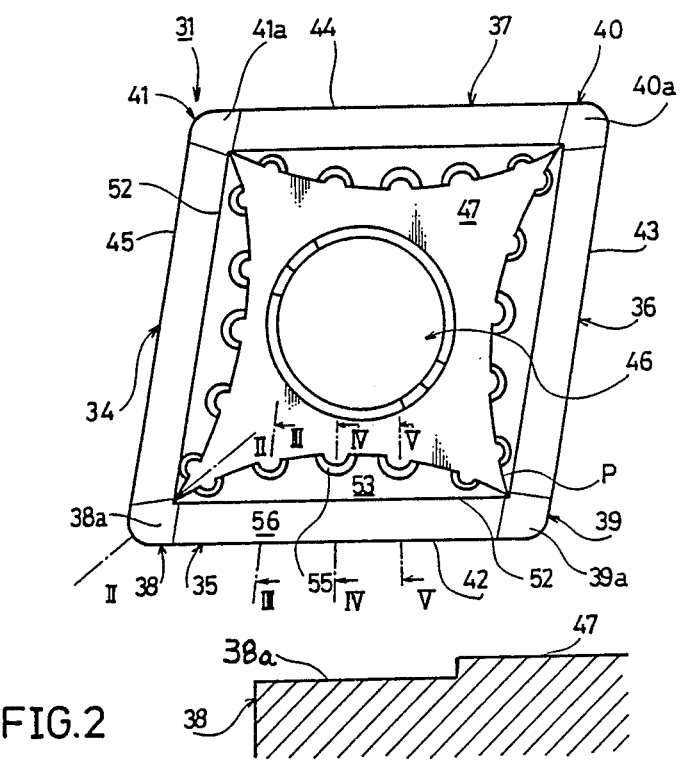
FIG. 1 is a plan view of a throwaway cutting tip according to an embodiment of the invention.
Figure 2:
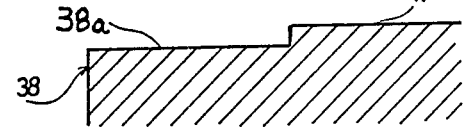
FIG. 2 is a sectional view taken along the line II—II in FIG. 1, showing the cross section of a nose portion of the throwaway tip of FIG. 1.
Figure 6:
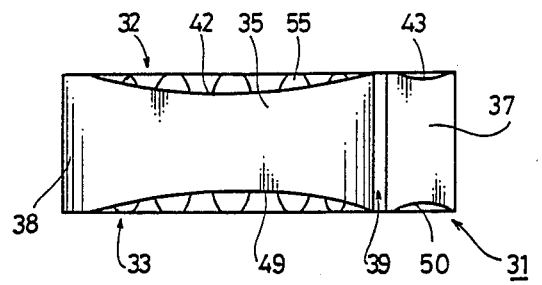
FIG. 6 is a front view of the embodiment of FIG. 1.

As is clear from FIGS. 1 and 6, the present throwaway cutting tip 31 has its contour defined between opposed substantially parallelogram-shaped main top and bottom surfaces 32 and 33 and lateral surfaces 34 to 37 interconnecting the main surfaces 32 and 33. In the throwaway tip 31, the substantially polygonal main surfaces 32 and 33 have their apexes formed as nose portions 38 to 41, and cutting edges 42 to 45 are formed between the nose portions 38 and 41. In FIG. 1, only the cutting edges 42 to 45 of one main surface 32 are shown, but cutting edges are likewise formed on the end edges of the other main surface 33, please see the cutting edges 49 and 50 shown in FIG. 6.

The throwaway tip 31 has a central attaching hole 46 passing through a flat portion 47 around the attaching hole 46, i.e., in the middle region of each of the main surfaces 32 and 33. The flat surfaces 47 are provided for correctly positioning and fixing the throwaway tip 31 by utilizing the attaching holes 46.

Further, the nose portions 38 to 41 have their corners rounded for smoothly merging into the cutting edges 42 to 45 and for preventing an increase of the cutting resistance in the nose portions.

The construction of the cutting edges 42 to 45 and of the main surfaces 32 and 33, which is characteristic of the invention, will now be described in detail.

As is clear from FIG. 6, in the throwaway tip 31, the cutting edge 42 formed on the main surface 32 and the cutting edge 49 formed on the main surface 33 in opposed relation to the cutting edge 42 are concave in an inward direction relative to the thickness of the tip such that the cutting edges 42, 49 are bent toward each other. Thus, as in the case of the throwaway tip described in U.S. Pat. No. 3,399,442, the cutting resistance is reduced and thermal sticking of chips is prevented.

Figure 3:
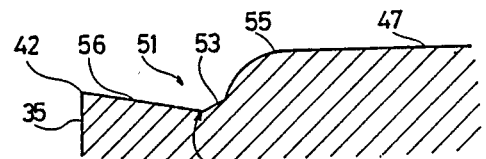
FIG. 3 is a sectional view taken along the line III—III in FIG. 1, showing the shape of the rake surface.
Figure 4:
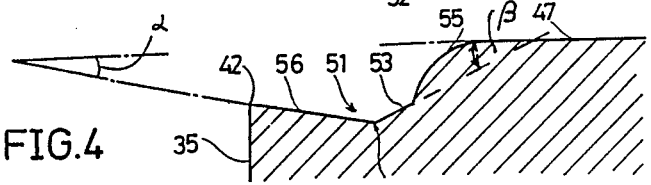
FIG. 4 is a sectional view taken along the line IV—IV in FIG. 1, showing a cross section of the rake surface.
Figure 5:
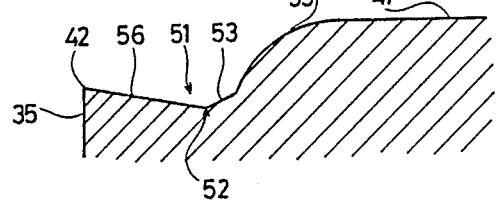
FIG. 5 is a sectional view taken along the line V—V in FIG. 1, also showing the shape of the rake surface.

As is clear from FIGS. 3 to 5, the main surface 32 has a concave rake surface 51 between the cutting edge 42 and the flat portion 47. This rake surface 51 has two portions namely a flat portion 56 and a concave curved surface portion 53 which connects the lowermost edge indicated by a line 52 of the flat rake surface portion 56 of the rake surface 51 to the flat portion 47. The surface 53 has a chip breaking function. That is, chips produced during a cutting operation are discharged while curling and contacting the chip breaker surface 53. The chip breaker surface 53 has a plurality of projections 55 arranged substantially along the direction in which the cutting edge 42 extends. As is clear from FIGS. 3 to 5, the projections 55 have such a shape that their tops are flush with the flat portion 47 and their remaining portions are substantially spherical. The projections 55 ensure that chips are discharged while making point contact with the projections 55. Thus, the area of contact of chips with the chip breaker surface 53 is much smaller than that in the conventional throwaway tip. Therefore, the cutting resistance can be reduced to a great degree.

In addition, the chip breaker surface 53 is obliquely formed such that it forms an angle $\beta$ of 20° to 35° with the flat portion 47. This range of angle, which has been selected for an efficient chip discharging, can be changed according to the size and shape of the projections 55 and the type of the work; it is not a critical range.

An end edge P defined between the chip breaker surface 53 and the flat portion 47, as is clear from FIG. 1, is in the form of an arc projecting inwardly in the middle of the length of the cutting edge 42 whereby the chip discharging efficiency is further improved.

In addition, the upper surfaces of the projections 55 described above are flush with the flat portion 47, but the remaining surface portions are not limited to a spherical shape and may be of any desired shape. However, to ensure a smooth discharge of chips, it is preferable that the projections 55 form at least a curved surface.

As for the size of the projections 55, as is clear from FIG. 1 these projections 55 change in size according to the width of the chip breaker surface 53. Thus, in the region where the chip breaker surface 53 is narrow, relatively small projections 55 are provided and in the region where the chip breaker surface 53 is wide, relatively large projections 55 are provided.

In the rake surface portion 51, an inclined surface portion 56 connected to the cutting edge 42 is generally sloping at a rake angle α of −5° to −6°, but in order to make the cutting active angle positive, it is preferable that the angle is about +10°, that is, in the middle portion of the cutting edge 42, α is in the range between +5° and +15° (see FIG. 4).

However, depending upon the type of the work piece, the angle may be outside the above range.

The above description refers to the cutting edge 42 and the rake surface 51 connected to the cutting edge 42, it being noted that the other cutting edges 43 to 45 and the rake surfaces connected to the cutting edges 43 to 45 are of the same described construction.

The nose portions 38 to 41 will now be described. The nose portions 38 to 41 have flat nose protecting surfaces 38a to 41a connected to end edges defined between the main surfaces 32 and 33 and the lateral surfaces 34 to 37. The nose protecting surfaces 38a to 41a are substantially parallel to the flat portion 47. Therefore, in the nose portions 38 to 41, the thickness is not directly thinned or reduced from the end edge to the inside, so that the strength is increased, preventing such undesirable phenomena as chipping from taking place.

In the above embodiment, the main surface 33 has a construction similar to that of the main surface 32; however, one main surface alone may be provided with cutting edges and rake surfaces. To make it possible to use the throwaway tip 31 for a prolonged period of time, however, it is preferable to provide both the main surfaces 32 and 33 with cutting edges and rake surfaces.

Figure 7:
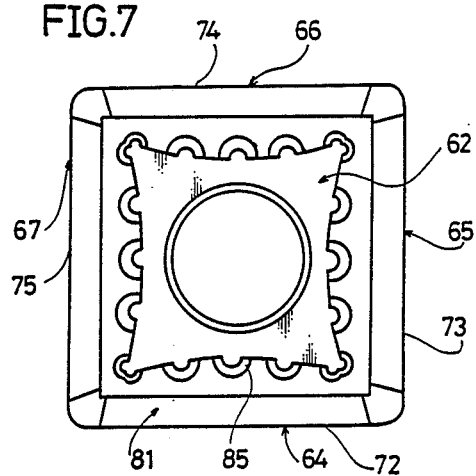
FIG. 7 is a plan view of a throwaway cutting tip according to a second embodiment of the invention.
Figure 8:
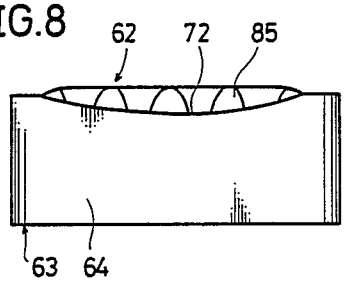
FIG. 8 is a front view of the throwaway cutting tip of the embodiment shown in FIG. 7.

FIGS. 7 and 8 show a throwaway tip 81 according to another embodiment of the invention. In the throwaway tip 61, main surfaces 62 and 63 have a substantially square shape. In this case, only the end edges defined between one main surface 62 and lateral surface 64 to 67 are formed with cutting edges 72 to 75. Therefore, rake surfaces 81 and projections 85 are formed only on one main surface. Thus, the throwaway tip 81 is usable only with one main surface 62, the other main surface being a simple surface.

Figure 9:
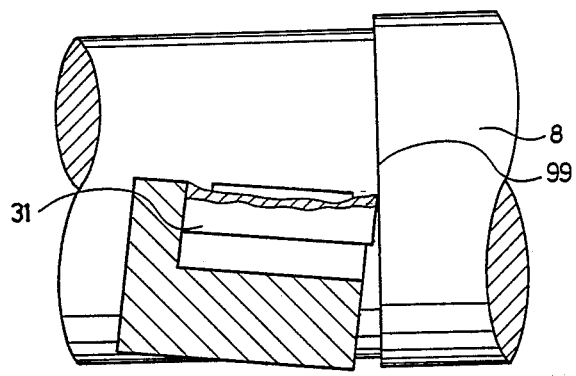
FIG. 9 is a front view for explaining the manner of cutting a work piece using a throwaway cutting tip of the invention.

In the throwaway tip 31 the inclined surface portion connecting to the cutting edge 42 of the rake surface 51, extends at an angle of about +10° and is set such that a positive active cutting angle is formed with respect to a work piece 8, for performing a predetermined cutting. Since the shape of the cutting edge 42 of the throwaway tip 31 is such that the middle portion is concave in an inward direction, the cutting resistance is low. Thermal sticking of a chip 99 shown in FIG. 9 is prevented, the chip being discharged while being curled by the rake surface 51. In this case, since a plurality of projections 55 are provided on the chip breaker surface 53, the chip 99 makes a point contact with the projection rather than contacting the breaker surface 55 over the entire width of the chip. Thus, the contact resistance is low, so that the chip 99 is smoothly discharged.

The fact that the rake surface 51 has a large width also contributes to a smooth discharge of the chip 99. Further, since the nose portions 38 and 39 are formed with nose protecting surfaces 38a and 39, such undesirable phenomena as tip breaking hardly occur.

Figure 10:
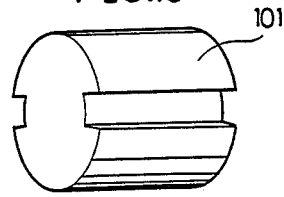
FIG. 10 is a perspective view showing an example of a work piece.

The results of cutting tests conducted using a work piece 101 of the shape shown in FIG. 10 are shown below.

First, cutting was done using a work piece made of SCM430 HB250 under the following conditions.

Work piece SCM430 HB250 and a cutting tip CNMG432 P20 shown in present FIGS. 1 to 6 were used.

Figure 11:
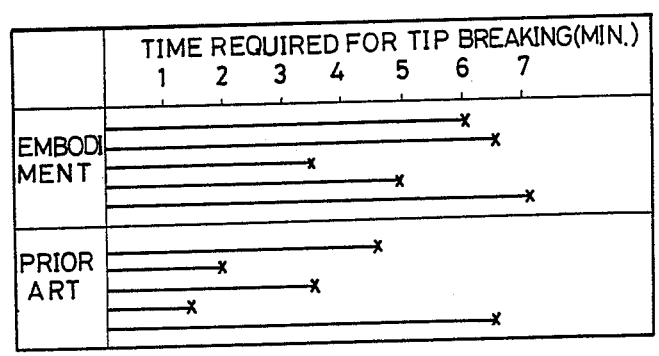
FIG. 11 is a graph showing a first cutting test result obtained by using a work piece of the shape shown in FIG. 10.

Conditions of cutting;
Cutting speed=100 m/min
Depth of cut=1.0 mm
Feed=0.2 mm/rev The result is as shown in FIG. 11, from which it can be seen that this embodiment of the invention is decidedly superior in strength to the conventional product. The test results shown in FIG. 11 and relating to the prior art are based on a tip shown in FIGS. 15, 16, and 17. Such a tip is known as type CNMG432UZ made by Sumitomo Electric Industries, Ltd.

Figures 12, 13, 14:
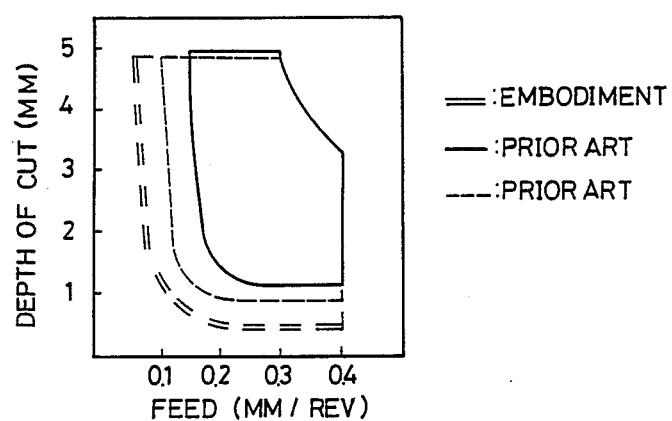
FIG. 12 is a graph showing a second cutting test result obtained by using a work piece of the shape shown in FIG. 10.
FIG. 13 is a graph showing a third cutting test result obtained by using a work piece of the shape shown in FIG. 10.
FIG. 14 is a graph showing the relationship between the cutting depth and the feed advance in a throwaway cutting tip of the invention and a conventional throwaway cutting tip.
Figure 15:
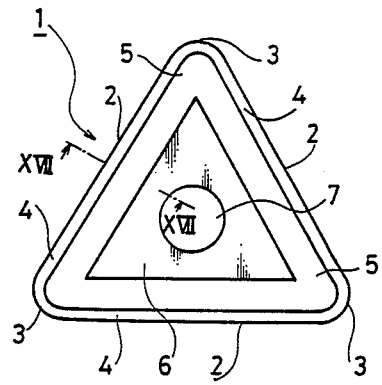
FIGS. 15 to 17 show an example of a conventional throwaway cutting tip.
Figures 16, 17:
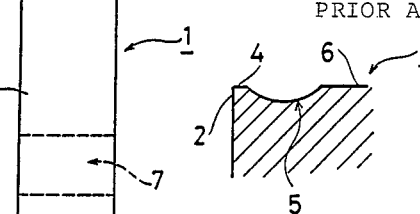
Figure 18:
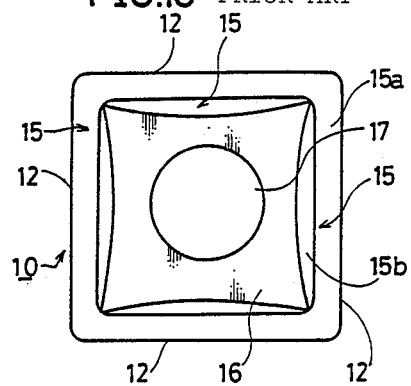
FIGS. 18 and 19 are a plan view and a side view, showing another example of a conventional throwaway cutting tip.
Figure 19:
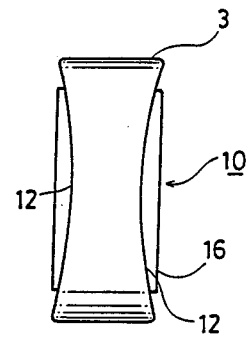
Figure 20:
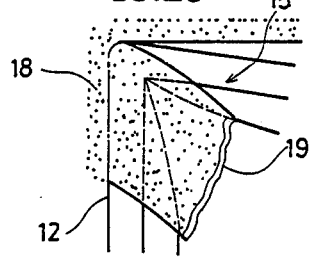
FIGS. 20 and 21 are a plan view and a sectional view for explaining how chips are produced during a cutting operation using the conventional throwaway tip shown in FIGS. 18 and 19.
Figure 21:
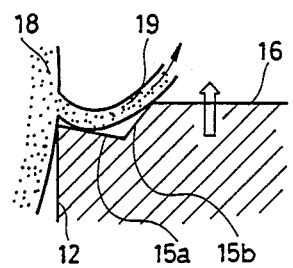

A test was conducted using a work piece SUS304 and a cutting tip CNMG432 under the following conditions of cutting:
Cutting speed=130 m/min
Depth of cut=3 mm
Feed=0.3 mm/rev The result is as shown in FIG. 12, from which it can be clearly seen that the cutting resistance of the throwaway tip of the invention is low since the resistance of the contact of the chips with the breaker surface is low a compared with that of two conventional tips. The result for the invention was obtained by a tip as shown in FIGS. 1 to 6. The first conventional tip was one as shown in FIGS. 15, 16, and 17. The second conventional tip was one as shown in FIGS. 18 and 19 known as type CNMP432 made by Kennametal, Inc.

Further, a test was conducted using Inconel 718 (R.T.M.) as a work piece and CNMG432 K10 as a tip under the following conditions of cutting:
Cutting speed=90 m/min
Depth of cut=2 mm
Feed=0.2 mm/rev The result is as shown in FIG. 13, from which it can be seen that the throwaway tip of the invention had taken a substantially longer period of time before tip breaking occurred than was the case in a conventional tip.

Further, as shown in FIG. 14, it can been found that the throwaway tip of the invention has a much wider range of chip disposal than the conventional products.

It goes without saying that the invention is not limited to the above embodiments. For example, the shape may be a triangle besides a quadrangle described in the above embodiments, and the projections may have a square form rather than being spherical. The tips used for obtaining the results shown in FIGS. 13 and 14 are the same tips as were used for the results of FIG. 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A throwaway cutting tip comprising opposed substantially polygonal main surfaces and lateral surfaces interconnecting said main surfaces for defining a cutting tip body having a substantially polygonal contour and a given thickness between said main surfaces, said cutting tip body comprising nose portions positioned at apexes of said substantially polygonal contour along end edges defined between at least one of said main surfaces and said lateral surfaces, inwardly projecting cutting edges located on at least one of said main surfaces between said nose portions, a flat surface portion formed in a central region of each of said main surfaces, a rake surface formed between said flat portion and each cutting edge, said rake surface having a flat portion and a concave portion having a curved segmental configuration, as seen in a top view, said concave portion having said segmental configuration forming a chip breaking surface, and a plurality of projections formed on said curved segmental configuration of said chip breaking surface portion of said rake surface, and wherein each of said nose portions comprises a nose protecting surface connected to an end edge defined between a respective one of said lateral surfaces and said main surface, said nose protecting surface extending inwardly in parallel to said flat surface portion, and wherein said plurality of projections differ in size according to the width of said rake surface, so that smaller projections are located where the width is narrow and larger projections are located where the width is larger.

2. The throwaway cutting tip of claim 1, wherein said projections have outer peripheral curved surfaces.

3. The throwaway cutting tip of claim 2, wherein said outer peripheral curved surfaces of said projections are spherical.

4. The throwaway cutting tip of claim 1, wherein said rake surface of said throwaway cutting tip encloses with a horizontal line a rake angle $\alpha$ which is within the range of $+5°$ to $+15°$.

5. The throwaway cutting tip of claim 1, wherein said chip breaking surface encloses with a horizontal line an angle $\beta$ which is within the range of $+20°$ to $+35°$.

6. The throwaway cutting tip of claim 1, wherein said chip breaking surface portion having said curved segmental configuration projects closest toward said flat surface portion in said central region about opposite the middle of the respective cutting edge.

* * * * *